United States Patent Office 3,749,778
Patented July 31, 1973

3,749,778
2,3-EPITHIO-5α-ANDROST-6-ENE COMPOUNDS
Taichiro Komeno, Osaka, Japan, assignor to Shionogi & Co., Ltd., Higashi-ku, Osaka, Japan
No Drawing. Application Dec. 24, 1969, Ser. No. 888,031, which is a continuation-in-part of abandoned application Ser. No. 769,412, Oct. 21, 1968. Divided and this application Aug. 30, 1971, Ser. No. 176,279
Claims priority, application Japan, Oct. 25, 1967, 42/68,682
Int. Cl. A61k 17/00
U.S. Cl. 424—241          25 Claims

ABSTRACT OF THE DISCLOSURE

2α,3α - epithio - 17-oxygenated-5α-androst-6-ene compounds of the formula:

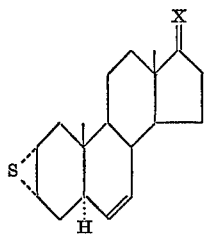

wherein X is an oxo group or a

group, in which R is a hydrogen atom or an optionally substituted lower hydrocarbon-carbonyl group or a substituted or unsubstituted cyclo-lower hydrocarbon group or tetrahydropyranyl group or tetrahydrofuranyl group; R′ is a hydrogen atom or a lower hydrocarbon group, having strong antiestrogenic activity accompanied with least side effects, pharmaceutical preparation containing one or more of them and process for preparation of these compounds.

---

This application is a divisional application of Ser. No. 888,031, filed on Dec. 24, 1969 and now U.S. Pat. No. 3,657,225, which in turn is a continuation-in-part of Ser. No. 769,412, filed on Oct. 21, 1968 and now abandoned The present invention relates to a new group of 2,3-epithio-5α-androstene compounds. More specifically, it relates to a 2α,3α-epithio-5α-androst-6-en-17β-ol and its derivatives.

The compounds of the present invention are represented by the general formula:

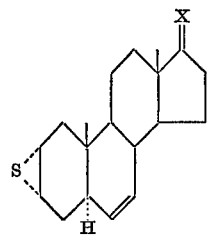   (I)

wherein X is an oxo group or a

group, in which R is a hydrogen atom or an optionally substituted lower hydrocarbon-carboxylic acyl group or a substituted or unsubstituted cyclo-lower hydrocarbon group or tetrahydropyranyl group or tetrahydrofuranyl group; R′ is a hydrogen atom or a lower hydrocarbon group.

The parent compounds lacking a double bond at position 6, namely 2α,3α-epithio-5α-androstane compounds have been utilized as most potential anabolic and antiestrogenic agent. However, they still possessed about a half of androgenic activity of testosterone. Therefore, when the compounds are administered to a female, or when the androgenic effect is undesirable, side effects such as virilism, etc., were serious problems to be solved for clinical use. In contrast, the compounds of the present invention have stronger antiestrogenic activity and related activities in contrast to one twentieth myogenic and one tenth androgenic activities than the parent compounds. and are the best antiestrogenic substances of the hitherto developed compounds. This feature is of the greatest importance in actual application, and the compounds of the present invention almost completely solved the difficult problems. Thus the compounds of the present invention are the best known medicines for treatment of masthopatia, gynecomastia, alleviation of symptom of mammary tumor and treatment of other diseases demanding antiestrogenic agent, with least side effects.

The compounds of the present invention are 2α,3α-epithio - 5α-androst-6-en-17β-ol and its modifications at position 17. The substituent at position 17α represented by R′ may be a hydrogen atom or a lower hydrocarbon group. Such a hydrocarbon group involves methyl, ethyl, propyl, isobutyl, vinyl, ethynyl, propinyl group and the like containing up to four carbon atoms. The hydroxyl group at position 17β may be acylated or etherized. The acylates or ethers represented by RO may be substituted or unsubstituted aliphatic acylates for example, alkanoates e.g. formate, acetate, propionate, enanthate, octanoate, decanoate, trimethylacetate, tert-butylacetate, cycloalkylalkanoates, adamantoate, haloacetate, crotonate, succinate, glutamate, camphorate, phenylpropionate, and the like, or aromatic acylates for example substituted or unsubstituted benzoate, e.g. sulfobenzoate, furoate, nicotinate, phthalate, substituted or unsubstituted phenoxyacetates, etc., or ethers for example substituted or unsubstituted tetrahydropyranyl ether, tetrahydrofuranyl ether, 1-cycloalkenyl ether, 1-alkoxycyloalkyl ether and the like.

Typical examples of the compounds of the present invention include: 2α,3α-epithio-5α-androst-6-en-17-one, 2α, 3α - epithio - 5α-androst-6-en-17β-ol, 2α,3α-epithio-5α-androst-6-en-17β-ol lower alkanoate, e.g. acetate, propionate, enanthate, octanoate, decanoate, etc., 2α,3α-epithio-5αandrost - 6-en-17β-ol phenylpropionate, 2α,3α-epithio-5α-androst-6-en-17β-ol benzoate, 2α,3α-epithio-17α-methyl-5α-androst - 6-en-17β-ol, 2α,3α-epithio-17α-ethyl-5α-androst-6 - en - 17β-ol, 2α,3α-epithio-17α-ethynyl-5α-androst-6-en - 17β-ol, 2α,3α-epithio-5α-androst-6-en-17β-ol tetrahydropyranyl ether, 2α,3α-epithio-17β-(1-lower alkoxycycloalkyl)oxy - 5α - androst-6-ene e.g. 2α,3α-epithio-17β-(1-methoxycyclopentyl)oxy-5α-androst-6-ene, and the like.

The compounds can be prepared from the known compounds by various methods. For example, 3,17-diacetyloxyandrost-5-ene is oxidized with chromium trioxide to obtain 7-oxoandrost-5-ene compound, which is hydrogenated, brominated at position 6, reduced at the ketone group at position 7 to afford bromohydrin and then dehydroxybrominated to introduce a double bond at position 6 and then oxidized at 3β-hydroxyl group to obtain 3-oxo-5α-androst-6-en-17β-ol. The novel compound thus obtained is halogenated at position 2 with a halogenating agent avoiding halogenation of the double bond at position 6, treated with a reducing agent to obtain novel 3β-hydroxy-2α-halo-5α-androst-6-ene compounds, and finally treated with a basic compound to obtain novel 2β,3β-epoxy-17-oxygenated-5α-androst-6-ene compounds, the starting material of the present invention. If required, modification at position 17 may be effected by e.g. oxidation of 17-hydroxyl group to 17-oxo group followed by reaction with an organo-metallic compound to give 17α-hydrocarbon substituted derivatives, or esterification or etherification at 17-hydroxyl group to obtain 17-ester or 17-ether.

The 2β,3β-epoxy-17-oxygenated-5α-androst-6-ene compounds are treated with thiocyanic acid in ether to give 3α-thiocyanato-5α-androst-6-ene-2β-ol compounds, which are then treated in a basic medium to obtain the desired 2α,3α-epithio-5α-androst-6-ene compounds. The products are acylated or etherified when necessary, according to conventional methods, e.g., by treatment with acid anhydried or acid halide, or treatment with 1,1-dilower alkoxy-cycloalkane.

The compounds of the present invention represented by the general Formula I have valuable pharmacological activities. For example, they are useful agents for regulation of physiological functions as evidenced by their antiestrogenic activity, myogenic activity, androgenic activity, uterotropic activity or antiuterotropic activity, antimammary growth activity, implantation delay and related activities. They are characterized by increase in the ratio of the major activities, namely antiestrogenic activity to myogenic and androgenic activities. For example, oral administration of 0.5 mg. of 2α,3α-epithio-5α-androst-6-en-17β-ol 17-acetate or subcutaneous administration of 0.3 mg. of 2α,3α-epithio-5α-androst-6-en-17β-ol per a mouse inhibited 48% or 56% of effect of simultaneously administered estradiol when estimated on vaginal TTC reduction. Subcutaneous injection of 10 mg. 2α,3α-epithio-5α-androst-6-en-17β-ol per a rat showed about the same increase in weight of seminal vesicle and about a half of the increase in weight of levator ani muscle when compared with that of 1 mg. testosterone propionate. These values show that the compounds of the present invention have stronger antiestrogenic activity than 2α,3α-epithio-5α-androstane compounds in spite of one twentieth myogenic activity and one tenth androgenic activity. Thus the compounds of the present invention are excellent medicines for treatment of masthopatia, gynecomastia, alleviation of symptoms of mammary tumor and treatments of diseases demanding antiestrogenic agents with least side effects for human and veterinary medicaments or additives to baits in a manner per se conventional in the art at a dose of 1γ to 100 mg. per kilogram of body weight for a day.

The compounds may be utilized in a wide variety of oral or parenteral dosage forms, solely or in admixture with other co-acting substances. They may be administered with a pharmaceutical carrier which can be a solid material or a liquid material in which the compound is dissolved, dispersed or suspended. The solid compositions can take the form of tablets, powders, granules, capsules, pills or the like. The liquid composition may take the form of injections, ointments, dispersions, suspensions, solutions, emulsions, syrups or elixirs. They may be flavoured, colored, and tablets and granules may be coated. All of the diluents e.g. starch, sucrose, lactose, calcium carbonate, kaolin, etc., coloring agents, aromatic substances, flavouring substances, bulking agents e.g. lactose, salt, glycine, starch, calcium carbonate, kaolin, bentonite, calcium phosphate, etc., binders e.g. starch, acacia, gelatin, glucose, sodium alginate, tragacanth, carboxymethylcellulose, etc., disintegrators e.g. starch, agar, carbonates, etc., lubricants e.g. stearic acid, talc, paraffin, boric acid, sodium benzoate, Carbowax, cacao oil, etc., ointment bases e.g. fats, oils, lard, wool fat, vaselin, glycerin, resins, glycols, emulsifying agents, etc., solvents e.g. water, polyethyleneglycol, olive oil, peanut oil, sesame oil, cacao oil, methyl or ethyl oleate, etc., solubilizing agent, buffers and stabilizing agents, may be used if the agents do not exert wrong effect on the compounds.

The following examples are given by way of illustration only and are not intended as limitations of the present invention, many apparent variations of which are possible without departing from the spirit and scope thereof. The abbreviations have the conventional meanings.

EXAMPLE 1

A solution in oil for intramuscular injection composed of 10 mg. of 2α,3α-epithio-5α-androst-6-en-17β-ol in 1 ml. of anhydrous sesame oil is prepared by sterilized procedure and administered once or twice a week to a patient, e.g. a woman in breast tumor.

EXAMPLE 2

An injection for subcutaneous injection, composed of 15 mg. of 2α,3α-epithio-5α-androst-6-en-17β-ol in 2 ml. of buffer solution is prepared by a conventional method and administered once a week to a patient, e.g. a man in gynecomastia.

EXAMPLE 3

Ten tablets are prepared from 25 mg. 2α,3α-epithio-17α-methyl-5α-androst-6-en-17β-ol, 750 mg. lactose, 220 mg. corn starch, 30 mg. magnesium stearate and 1.9 g. sucrose, using gum arabic, talc, distilled water, coloring agent and then coated with sugar syrup, gum arabic and talc. Four tablets are administered to a patient per a day, e.g. a woman in mastopathia.

What we claim is:

1. A pharmaceutical preparation for human and veterinary use comprising an effective amount of a compound of the formula:

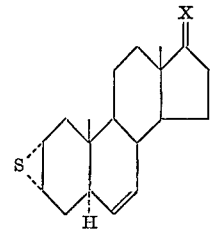

wherein X is oxo or a group

in which R is hydrogen, optionally substituted lower hydrocarbon-carboxylic acyl, optionally substituted cyclolower hydrocarbon group, tetrahydropyranyl, or tetrahydrofuranyl group, and R' is hydrogen or lower hydrocarbon group, as an active ingredient, and a pharmaceutical carrier.

2. A pharmaceutical preparation according to claim 1 wherein the preparation is in a form suitable for subcutaneous or oral administration.

3. The process for the treatment of diseases demanding antiestrogenic agent, which comprises administering an effective amount of a compound of the formula:

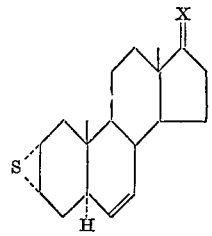

wherein X is oxo or a group

in which R is hydrogen, optionally substituted lower hydrocarbon-carboxylic acyl, optionally substituted cyclolower hydrocarbon group, tetrahydropyranyl, or tetrahydrofuranyl group, and R' is hydrogen or lower hydrocarbon group.

4. A pharmaceutical preparation according to claim 1, wherein the effective compound is 2α,3α-epithio-5α-androst-6-ene-17β-ol.

5. A pharmaceutical preparation according to claim 1, wherein the effective compound is 2α,3α-epithio-17α-methyl-5α-androst-6-ene-17β-ol.

6. A pharmaceutical preparation according to claim 1, wherein the effective compound is 2α,3α-epithio-5α-androst-6-ene-17-one.

7. A pharmaceutical preparation according to claim 1, wherein the effective compound is 2α,3α-epithio-5-androst-6-ene-17β-ol lower alkanoate.

8. A pharmaceutical preparation according to claim 1, wherein the effective compound is 2α,3α-epithio-5α-androst-6-en-17β-ol enanthate.

9. A pharmaceutical preparation according to claim 1, wherein the effective compound is 2α,3α-epithio-5α-androst-6-en-17β-ol octanoate.

10. A pharmaceutical preparation according to claim 1, wherein the effective compound is 2α,3α-epithio-5α-androst-6-en-17β-ol decanoate.

11. A pharmaceutical preparation according to claim 1, wherein the effective compound is 2α,3α-epithio-5α-androst-6-en-17β-ol benzoate.

12. A pharmaceutical preparation according to claim 1, wherein the effective compound is 2α,3α-epithio-5α-androst-6-en-17β-ol phenylpropionate.

13. A pharmaceutical preparation according to claim 1, wherein the effective compound is 2α,3α-epithio-17α-ethynyl-5α-androst-6-en-17β-ol.

14. A pharmaceutical preparation according to claim 1, wherein the effective compound is 2α,3α-epithio-17β-(1-methoxycyclopentyl)oxy-5α-androst-6-ene.

15. A process according to claim 3, wherein the effective compound is 2α,3α-epithio-5α-androst-6-ene-17β-ol.

16. A process according to claim 3, wherein the effective compound is 2α,3α-epithio-17α-methyl-5α-androst-6-ene-17β-ol.

17. A process according to claim 3, wherein the effective compound is 2α,3α-epithio-5α-androst-6-ene-17-one.

18. A process according to claim 3, wherein the effective compound is 2α,3α-epithio-5-androst-6-ene-17β-ol lower alkanoate.

19. A process according to claim 3, wherein the effective compound is 2α,3α-epithio-5α-androst-6-en-17β-ol enanthate.

20. A process according to claim 3, wherein the effective compound is 2α,3α-epithio-5α-androst-6-en-17β-ol octanoate.

21. A process according to claim 3, wherein the effective compound is 2α,3α-epithio-5α-androst-6-en-17β-ol decanoate.

22. A process according to claim 3, wherein the effective compound is 2α,3α-epithio-5α-androst-6-en-17β-ol benzoate.

23. A process according to claim 3, wherein the effective compound is 2α,3α-epithio-5α-androst-6-en-17β-ol phenylpropionate.

24. A process according to claim 3, wherein the effective compound is 2α,3α-epithio-17α-ethynyl-5α-androst-6-en-17β-ol.

25. A process according to claim 3, wherein the effective compound is 2α,3α-epithio-17β-(1-methoxycyclopentyl)oxy-5α-androst-6-ene.

References Cited
UNITED STATES PATENTS

| | | | |
|---|---|---|---|
| 3,230,215 | 1/1966 | Komeno | 260—239.5 |
| 3,290,294 | 12/1966 | Komeno | 260—239.5 |
| 3,301,850 | 1/1967 | Klimstra | 260—239.5 |
| 3,405,124 | 10/1968 | Klimstra | 260—239.5 |
| 3,519,715 | 7/1970 | Nagata et al. | 424—241 |

SHEP K. ROSE, Primary Examiner

U.S. Cl. X.R.

260—239.5